(12) United States Patent
Kopecek

(10) Patent No.: US 11,608,878 B2
(45) Date of Patent: Mar. 21, 2023

(54) LOCKING COMPOUND ROTARY ACTUATOR

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/819,891

(22) Filed: Aug. 15, 2022

(65) Prior Publication Data

US 2022/0389992 A1 Dec. 8, 2022

Related U.S. Application Data

(62) Division of application No. 17/107,149, filed on Nov. 30, 2020, now Pat. No. 11,473,658.

(51) Int. Cl.
*F16H 25/24* (2006.01)

(52) U.S. Cl.
CPC .............................. *F16H 25/2454* (2013.01)

(58) Field of Classification Search
CPC .......... F16H 25/2454; F16H 3/62; F16H 3/64; F16H 37/082
USPC ....................................................... 475/323
See application file for complete search history.

(56) References Cited

U.S. PATENT DOCUMENTS

| | | |
|---|---|---|
| 4,240,332 A | 12/1980 | Deutsch |
| 4,463,661 A | 8/1984 | Tootle |
| 4,603,594 A | 8/1986 | Grimm |
| 4,703,683 A | 11/1987 | Sue |
| 4,742,758 A | 5/1988 | Della Rocca |
| 4,785,718 A | 11/1988 | Hata et al. |
| 5,267,760 A | 12/1993 | Carlin |
| 6,863,518 B2 | 3/2005 | Powers |
| 8,316,632 B2 | 11/2012 | West et al. |
| 8,715,132 B2 | 5/2014 | Kopecek |
| 8,904,751 B2 | 12/2014 | Howarth et al. |
| 8,932,176 B2 | 1/2015 | Kopecek |

(Continued)

FOREIGN PATENT DOCUMENTS

| | | |
|---|---|---|
| CA | 2762397 | 6/2012 |
| GB | 2435877 | 9/2007 |

OTHER PUBLICATIONS

International Search Report and Written Opinion for International Appln. No. PCT/US2021/059658, dated Mar. 30, 2022, 22 pages.

(Continued)

*Primary Examiner* — Randell J Krug
(74) *Attorney, Agent, or Firm* — Fish & Richardson P.C.

(57) ABSTRACT

The subject matter of this specification can be embodied in, among other things, a rotary lock assembly that includes a first epicyclic gear assembly having a first sun gear assembly, a first ring gear assembly, and a first planet gear assembly mechanically engaged to the first sun gear assembly and the first ring gear assembly, and a second epicyclic gear assembly having a second sun gear assembly configured to be rotated by the first ring gear assembly, a second ring gear assembly, and a second planet gear assembly mechanically engaged to the second sun gear assembly and the second ring gear assembly.

6 Claims, 12 Drawing Sheets

(56) References Cited

U.S. PATENT DOCUMENTS

| | | |
|---|---|---|
| 9,366,201 B2 | 6/2016 | Caruel |
| 9,863,518 B2 * | 1/2018 | Kurth .................... F16H 48/10 |
| 10,767,412 B2 | 9/2020 | Scheuring et al. |
| 11,473,658 B2 | 10/2022 | Kopecek |
| 2003/0171185 A1 | 9/2003 | Potter et al. |
| 2009/0090203 A1 | 4/2009 | Jones et al. |
| 2013/0152717 A1 | 6/2013 | Kopecek |
| 2015/0176679 A1 | 6/2015 | Lohmann et al. |
| 2016/0097407 A1 | 4/2016 | Kopecek |
| 2020/0165856 A1 | 5/2020 | Scheuring et al. |
| 2022/0170536 A1 | 6/2022 | Kopecek |

OTHER PUBLICATIONS

Invitation to Pay Additional Fees for International Appln. No. PCT/US2021/059685, dated Feb. 7, 2022, 16 pages.

\* cited by examiner

LOCKING COMPOUND ROTARY ACTUATOR

CROSS-REFERENCE TO RELATED APPLICATION(S)

This application is a divisional of and claims the benefit of priority to U.S. application Ser. No. 17/107,149, filed Nov. 30, 2020, the contents of which are hereby incorporated by reference.

TECHNICAL FIELD

This instant specification relates to rotary-to-linear motion conversion devices for use with aircraft cascade reverser actuators.

BACKGROUND

Conventional linear actuators have output rams that may be driven by a motor or with pneumatic or hydraulic pressure. The actuator may have a lock mechanism to retain the output in a fixed position. Known lock mechanisms, such as taught by Tootle in U.S. Pat. No. 4,463,661, engage an actuator synchronization system, and therefore provide only indirect locking to the output ram. Direct locking mechanisms that employ a linear actuator have been developed and typically include a multi-piece housing with increased size and mass. Such actuators include tine locks, an example of which is disclosed by Carlin in U.S. Pat. No. 5,267,760. While some tine lock arrangements may allow for a single-piece housing actuator, they have the disadvantage of using a flexing lock element with consequential fatigue considerations. Locking actuators can be operated by a rotary source rather than hydraulically or pneumatically. Present rotary source operated actuators, such as disclosed by Grimm in U.S. Pat. No. 4,603,594, have the disadvantage of requiring an electrically operated solenoid mechanism (or other mechanical input separate from the rotary source) to unlock the actuator lock before motion of the ram can commence. Ball lock mechanisms such as taught by Sue in U.S. Pat. No. 4,703,683, Deutch in U.S. Pat. No. 4,240,332 and Della Rocca in U.S. Pat. No. 4,742,758 have the disadvantage of a low external load carrying capability of the ram, because of the point contact stresses imposed on the lock balls. Linear motion lock sleeve and key arrangements, such as disclosed by Kopecek (the inventor of the present disclosure) in UK patent GB2435877, include a rotary-to-linear motion conversion mechanism for the lock sleeve and complexity associated therewith. Rotary lock sleeve and key arrangements have also been disclosed by Kopecek in U.S. Pat. No. 8,715,132. Accordingly, it would be desirable to provide a linear actuator arrangement that overcomes at least some of the problems identified above.

SUMMARY

In general, this document describes rotary-to-linear motion conversion devices. More particularly, this document describes rotary-to-linear motion conversion devices for use with aircraft cascade reverser actuators.

In an example embodiment, a rotary lock assembly includes a first epicyclic gear assembly having a first sun gear assembly, a first ring gear assembly, and a first planet gear assembly mechanically engaged to the first sun gear assembly and the first ring gear assembly, and a second epicyclic gear assembly having a second sun gear assembly configured to be rotated by the first ring gear assembly, a second ring gear assembly, and a second planet gear assembly mechanically engaged to the second sun gear assembly and the second ring gear assembly.

Various embodiments can include some, all, or none of the following features. The rotary lock assembly can also include a lock key configured for radial displacement between a first lock key configuration and a second lock key configuration, and a lock rotor configured to be rotated by the second planet gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted. The rotary lock assembly can also include a first lock rotor stop configured to prevent rotation of the lock rotor in a first direction at the first rotor configuration, and a second lock stop configured to prevent rotation of the lock rotor in a second direction at the second rotor configuration. The rotary lock assembly can also include a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted. The rotary lock assembly can also include a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face. The rotary lock assembly can also include a screw lead engaged to the first planet gear assembly and responsive to revolution of the first planet gear assembly, and a nut engaged with the screw lead and axially movable along the screw lead in response to rotation of the screw lead. The rotary lock assembly can also include a housing engaged to the second ring gear assembly, and an input shaft coupled to the first sun gear assembly and rotatable relative to the housing. The second ring gear assembly can be configured to remain fixed relative to motion of the second sun gear assembly.

In an example implementation, a method of locking a linear actuator includes receiving torque at a first sun gear of a first epicyclic gear assembly, transmitting torque from the first sun gear to a first ring gear of the first epicyclic gear assembly through a first planet gear assembly of the first epicyclic gear assembly, transmitting torque from the first planet gear assembly to a screw, urging movement of a linear output member through a nut configured for linear motion based on rotation of the screw, transmitting torque from the first ring gear to a second sun gear of a second epicyclic gear assembly, and transmitting torque from the second sun gear to a second planet gear engaged between the second sun gear and a second ring gear.

Various implementations can include some, all, or none of the following features. The method can also include urging radial displacement of a lock key from a first lock key configuration to a second lock key configuration based on linear movement of the linear output member. The method can also include contacting, based on movement of the linear actuator, the lock key with an axial groove face of a groove defined in the linear output member and configured to receive the lock key in the first lock key configuration, preventing linear movement of the linear output member based on interference between the lock key and the axial groove face, preventing rotation the screw based on the prevented linear movement of the linear output member, preventing rotation of the first planet gear assembly based on the prevented rotation of the screw, and transmitting substantially all torque received at the first sun gear to the first ring gear. The method can also include transmitting torque from the second planet gear to a lock rotor, and rotating the lock rotor from a first lock rotor configuration to a second lock rotor configuration. The first lock rotor configuration can be a first rotational position defined by a first lock rotor end stop configured to interfere with rotation of the lock rotor in a first direction, and the second lock rotor configuration is a second rotational position defined by a second lock rotor end stop configured to interfere with rotation of the lock rotor in a second direction opposite the first direction. The lock rotor can be configured to prevent radial displacement of a lock key from a first key configuration to a second key configuration in the first lock rotor configuration, and is configured to permit radial displacement of the lock key from the first key configuration to the second key configuration in the second lock rotor configuration.

In another example embodiment, a linear actuator includes a housing, a rotary input member rotatably moveable relative to the housing, a linear output member axially movable between a first output position relative the housing, and a second output position relative to the housing, and a rotary lock assembly disposed within the housing and constrained from axial motion, the rotary lock assembly having a first epicyclic gear assembly that includes a first sun gear assembly, a first ring gear assembly, and a first planet gear assembly mechanically engaged to the first sun gear assembly and the first ring gear assembly, and a second epicyclic gear assembly that includes a second sun gear assembly configured to be rotated by the first ring gear assembly, a second ring gear assembly, and a second planet gear assembly mechanically engaged to the second sun gear assembly and the second ring gear assembly.

Various embodiments can include some, all, or none of the following features. The rotary lock assembly can also include a lock key configured for radial displacement between a first lock key configuration and a second lock key configuration, and a lock rotor configured to be rotated by the second planet gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted. The rotary lock assembly can also include a first lock rotor stop configured to prevent rotation of the lock rotor in a first direction at the first rotor configuration, and a second lock stop configured to prevent rotation of the lock rotor in a second direction at the second rotor configuration. The rotary lock assembly can also include a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted. The rotary lock assembly can also include a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face. The rotary lock assembly can also include a screw lead engaged to the first planet gear assembly and responsive to revolution of the first planet gear assembly, and a nut engaged with the screw lead and axially movable along the screw lead in response to rotation of the screw lead. The rotary lock assembly can also include a housing engaged to the second ring gear assembly, and an input shaft coupled to the first sun gear assembly and rotatable relative to the housing. The second ring gear assembly can be configured to remain fixed relative to motion of the second sun gear assembly.

The systems and techniques described here may provide one or more of the following advantages. First, a system can lock linear actuators against unintended extension. Second they system can provide more reliable unlocking operations, especially under conditions of high mechanical loads on the linear actuators. Third, the system can automatically provide the additional torque needed to perform the unlocking. Fourth, the system can provide the additional torque without additional control or power inputs.

The details of one or more implementations are set forth in the accompanying drawings and the description below. Other features and advantages will be apparent from the description and drawings, and from the claims.

DETAILED DESCRIPTION

This document describes systems and techniques for providing rotary-to-linear motion with an actuator device that can be locked to prevent unintentional movement. Some prior locking designs are limited in the amount of tension load that may be applied to the actuator ram while still allowing lock keys to unlock. The designs described in this document provide a capability to unlock the actuator under the high-tension loads that can be generated by the latest technology thrust reversers. As will be discussed in more detail below, the actuator includes features that automatically redirect input torque when needed, in order to overcome binding or lock components under high input forces. In general, the rotary-to-linear conversion function of the actuator is achieved with a multi-stage planetary gearbox, in which one stage drives the rotary-to-linear conversion, and resistance to that conversion drives a second stage that performs unlocking actions. The second stage is gear-reduced to provide increased torque to perform the unlocking, which can be helpful in situations when high linear forces can cause the locking components to bind or otherwise become difficult to unlock.

Figure 1:
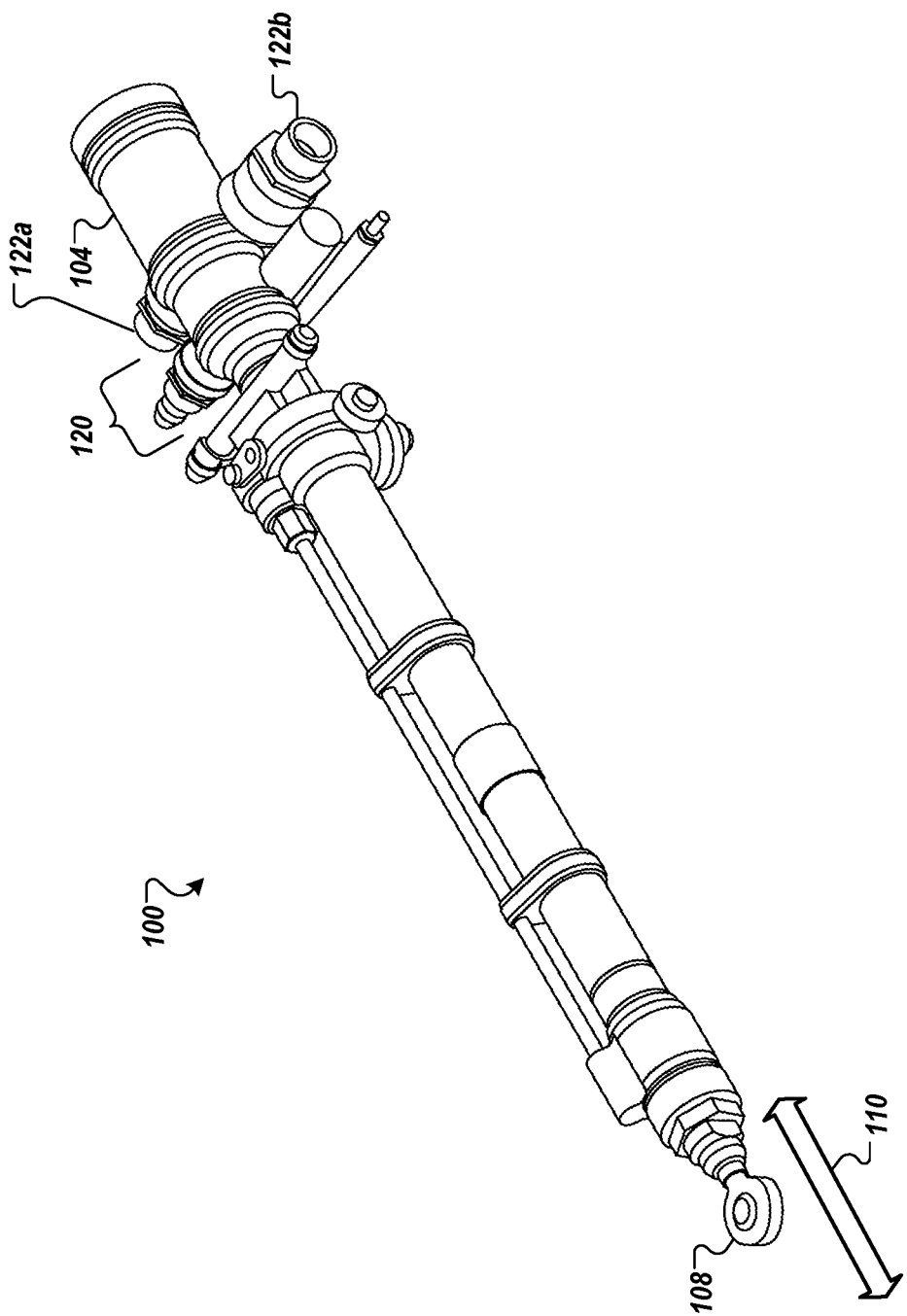
FIG. 1 shows a front perspective view of an example linear actuator.

FIG. 1 illustrates a front perspective view of an example linear actuator 100 incorporating aspects of the disclosed embodiments. The actuator 100 has an outer housing 104 and an output ram 108 (e.g., a linear output assembly). The output ram 108, which is capable of axial movement or motion (depicted by direction arrow 110) into and out of the housing 104, such as from a retracted output position as shown in FIG. 1. In some embodiments, the linear actuator 100 can be part of a thrust reverser actuation system (TRAS). As a non-limiting example, the ram 108 may be attached to a door, panel, or engine thrust reverser, while the housing 104 is attached to a frame of a larger object, such as, but not limited to, an airplane. Movement of the ram 108 thereby determines the position of the door, panel, or thrust reverser, or other attaching surface.

Within the housing 104, an actuator (not shown) drives the extension and retraction of the output ram 108 based on rotational energy received from a synchronization shaft (not shown) connected to the actuator through an aperture 122a and/or 122b. This actuator will be described in more detail in the descriptions of FIGS. 2-6. In some embodiments, the linear actuator 100 can also include a sensor configured to provide positional signals or information that is representative of the linear output position (e.g., extension or retraction) of the output ram 108.

When the output ram 108 is retracted into the housing 104, a locking rotary actuator mechanism 120 may be locked to prevent inadvertent or unintended extension of the ram 108 from the housing 104. The locking rotary actuator mechanism 120 for the linear actuator 100 is discussed in more detail below.

Figure 2:
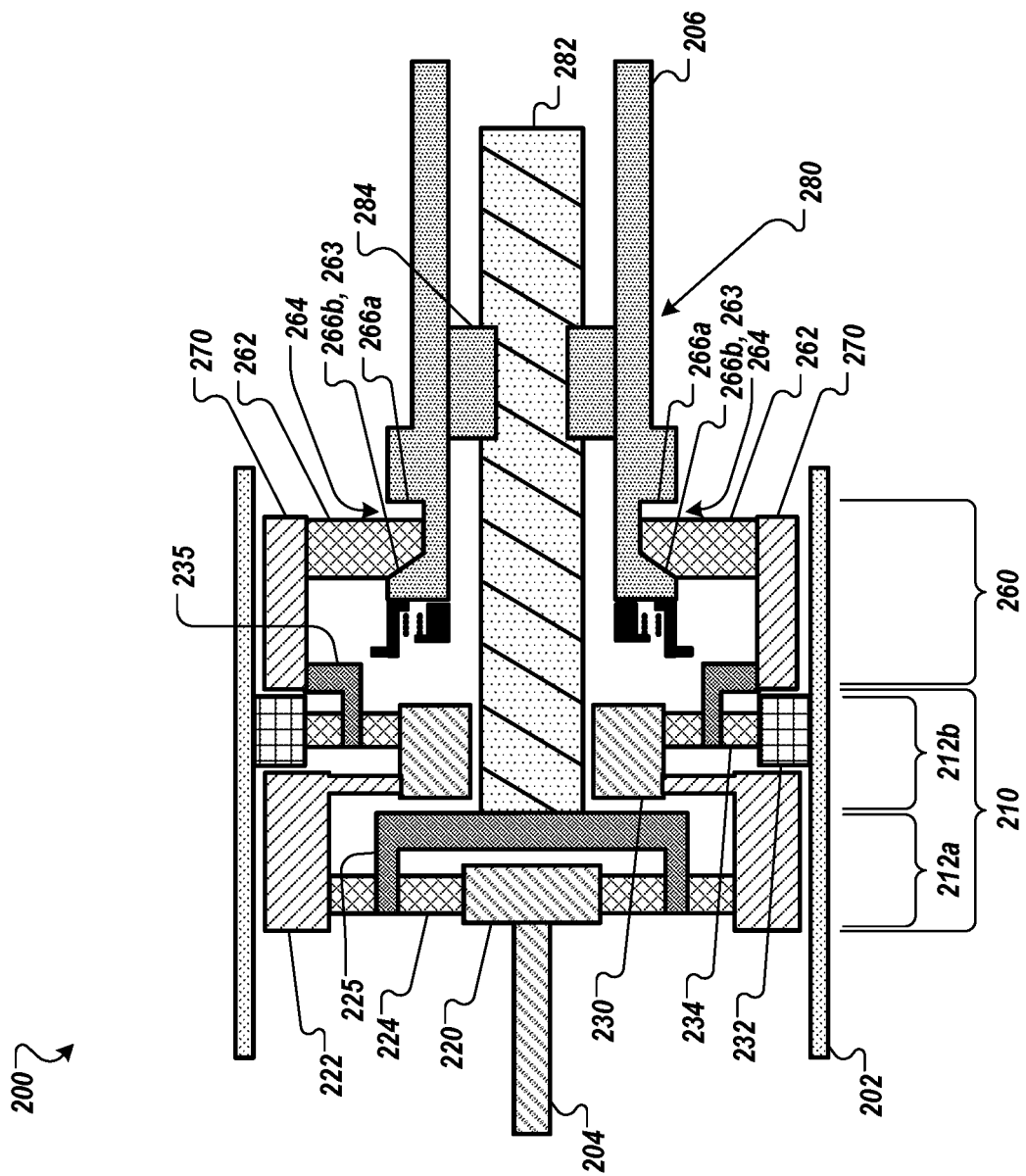
FIGS. 2 and 3 show cross section views of an example locking rotary actuator mechanism in a locked configuration.
Figure 3:
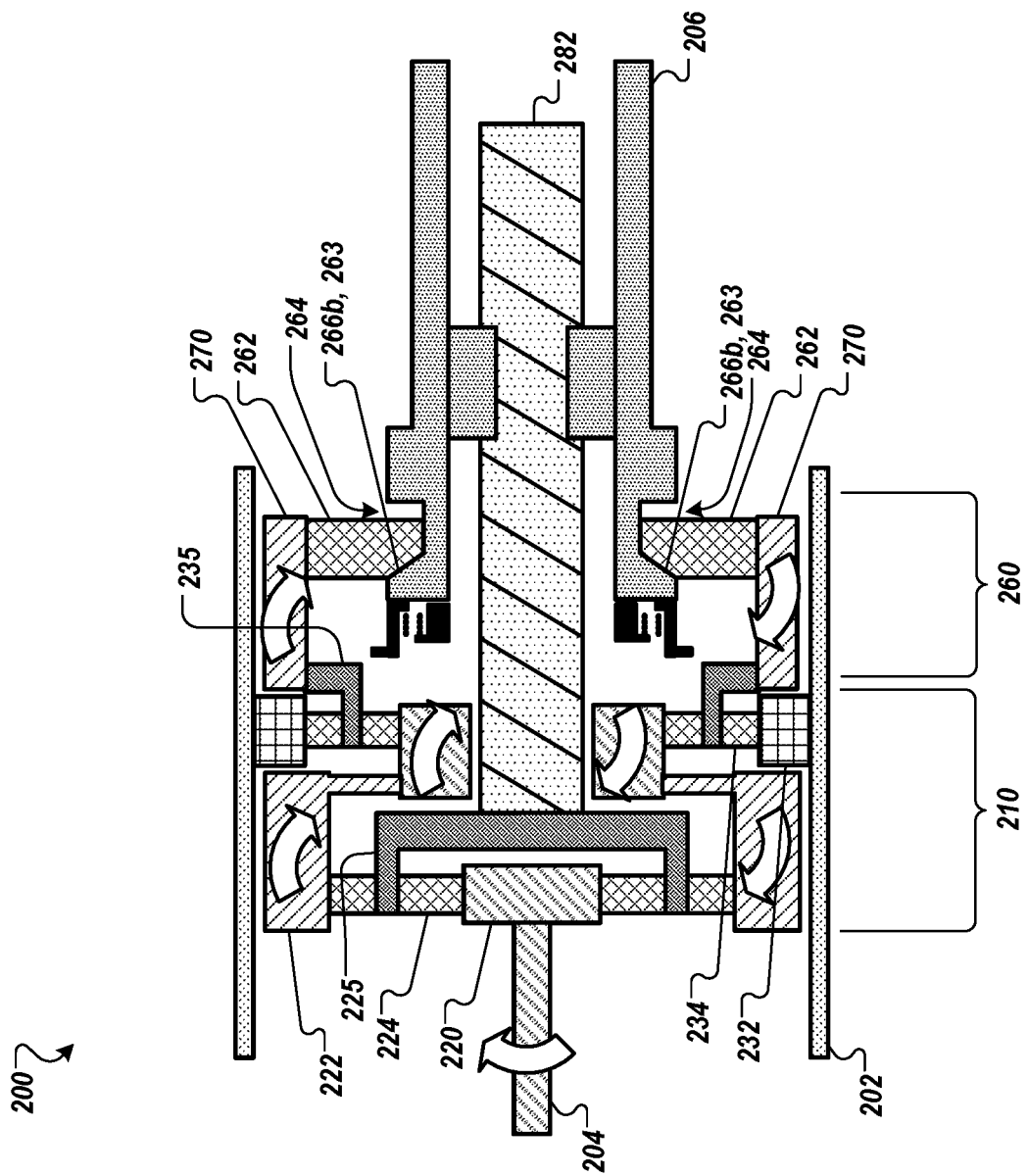

FIGS. 2 and 3 show cross section views of an example locking rotary actuator mechanism 200 in a locked configuration. In some embodiments, the locking rotary actuator mechanism 200 can be the example locking rotary actuator mechanism 120 of FIG. 1.

The locking rotary actuator mechanism 200 includes a housing 202, rotary input shaft member 204, and a linear output assembly 206. Rotation of the rotary input shaft member 204 (e.g., by a synchronization shaft, by a direct-drive motor) urges linear motion of the linear output member 206 through an epicyclic gear assembly 210, a rotary lock assembly 260, and a rotary-to-linear motion conversion assembly 280. The rotary-to-linear motion conversion assembly 280 includes a screw lead 282 that is rotated by the epicyclic gear assembly 210, and a nut 284 that is affixed to the linear output assembly 206 and is driven linearly as the screw lead 282 rotates.

The rotary lock assembly 260 includes a collection of lock keys 262 that are configured for radial displacement and to engage with a groove 264 defined in a radially outer surface of the linear output assembly 206. The groove 264 includes an axial groove face 266a and an axial groove face 266b. The axial groove face 266b is configured with a bevel that is complimentary to a bevel 263 of the lock key 262. In some embodiments, the bevel 263 is angled typically about 25 degrees from the radially outward direction. When locked, the lock keys 262 prevent the linear output assembly 206 from extending by contacting the axial groove face 266b. The lock keys 262 are prevented from moving radially out of the locked position by a lock rotor 270. The lock rotor 270 can be partly rotated to selectively prevent and permit radial movement of the lock keys 262. The lock rotor 270 is discussed in more detail in the description of FIG. 11.

The epicyclic gear assembly 210 includes an epicyclic gear subassembly 212a and an epicyclic gear subassembly 212b. The screw lead 282 is rotated by the rotary input shaft member 204 thought the epicyclic gear subassembly 212a. The lock rotor 270 is rotated by the rotary input shaft member 204 through the epicyclic gear subassembly 212b.

The epicyclic gear subassembly 212a includes a sun gear assembly 220, a ring gear assembly 222, and a planet gear assembly 224. The epicyclic gear subassembly includes a sun gear assembly 230, a ring gear assembly 232, and a planet gear assembly 234. The ring gear assembly 232 is affixed (e.g., grounded) to the housing 202 or otherwise prevented from rotating relative to the rotary input shaft member 204, the screw lead 282, and the other components of the epicyclic gear assembly 210. The sun gear assembly 230 is affixed to or otherwise configured to be driven by rotation of the ring gear assembly 222. A planet carrier 225 connects the planet gear assembly 224 to the screw lead 282 such that rotation of the planet gear assembly 224 can urge rotation of the screw lead 282. A planet carrier 235 connects the planet gear assembly 234 to the lock rotor 270 such that rotation of the planet gear assembly 224 can urge rotation of the lock rotor 270.

The locking rotary actuator mechanism 200 uses a lost motion mechanism incorporating the epicyclic gear assembly 210 that operates as a star gear (e.g., grounded planet gear assembly 224 where the sun gear assembly 220 drives the ring gear assembly 222) during the unlocking process of the lock keys 262, and then operates as a planetary gear (e.g., grounded ring gear assembly 222 where the sun gear assembly 220 drives the planet gear assembly 224). In some implementations, this arrangement can provide force for unlocking of the lock as long as tension loads upon the output ram 108 are not too great. This is because tension loads on the piston are reacted into a radially outward force on the lock keys 262 by the bevel 263 and the axial groove face 266b. The tension load on the piston therefore results in an increased frictional force between the lock key 262 and an inner face of the lock rotor 270. This friction force opposes the unlocking torque on the ring gear assembly 222 when the epicyclic gear subassembly 212a is operating in star (unlocking) mode.

Referring now to FIG. 3, the example locking rotary actuator mechanism 200 is shown in an initial state of unlocking. In the illustrated example, a high tension exists on the linear output assembly 206. High tension loads imposed on the linear output assembly 206 (e.g., by advanced technology thrust reversers) during the unlocking process can create a frictional force between the lock keys 262 and the lock rotor 270 that is high enough to prevent rotation of the lock rotor 270 during the unlocking process. Without the help of additional mechanical force provided by the epicyclic gear subassembly 212b, such frictional forces could prevent unlocking in some circumstances.

With the linear output assembly 206 locked, the rotary-to-linear motion conversion assembly 280 is substantially prevented from operating and the screw lead 282 substantially prevented from rotating. As such, the planet carrier 225 and the planet gear assembly 224 are also substantially prevented from moving. As such, the carrier 225 of planet gear assembly 224 is substantially grounded.

The rotary input shaft member 204 is rotated, which urges rotation of the sun gear assembly 220. Substantially all of the torque provided by the sun gear assembly 220 is transmitted through the planet gear assembly 224 (e.g., which is currently grounded) to the ring gear assembly 222. The ring gear assembly 222 rotates, urging rotation of the sun gear assembly 230.

Since the ring gear assembly 232 is grounded to the housing 202, rotation of the sun gear assembly 230 urges rotation of the planet gear assembly 234. Rotation of the planet gear assembly 234 is transmitted along the planet carrier 235 to urge rotation of the lock rotor 270. In the illustrated example, substantially all of the torque provided at the rotary input shaft member 204 is transmitted to the lock rotor 270, and the epicyclic gear subassembly 212b provides a gear reduction that multiplies the force that is available to overcome friction between the lock keys 262 and the lock rotor 270.

Figure 4:
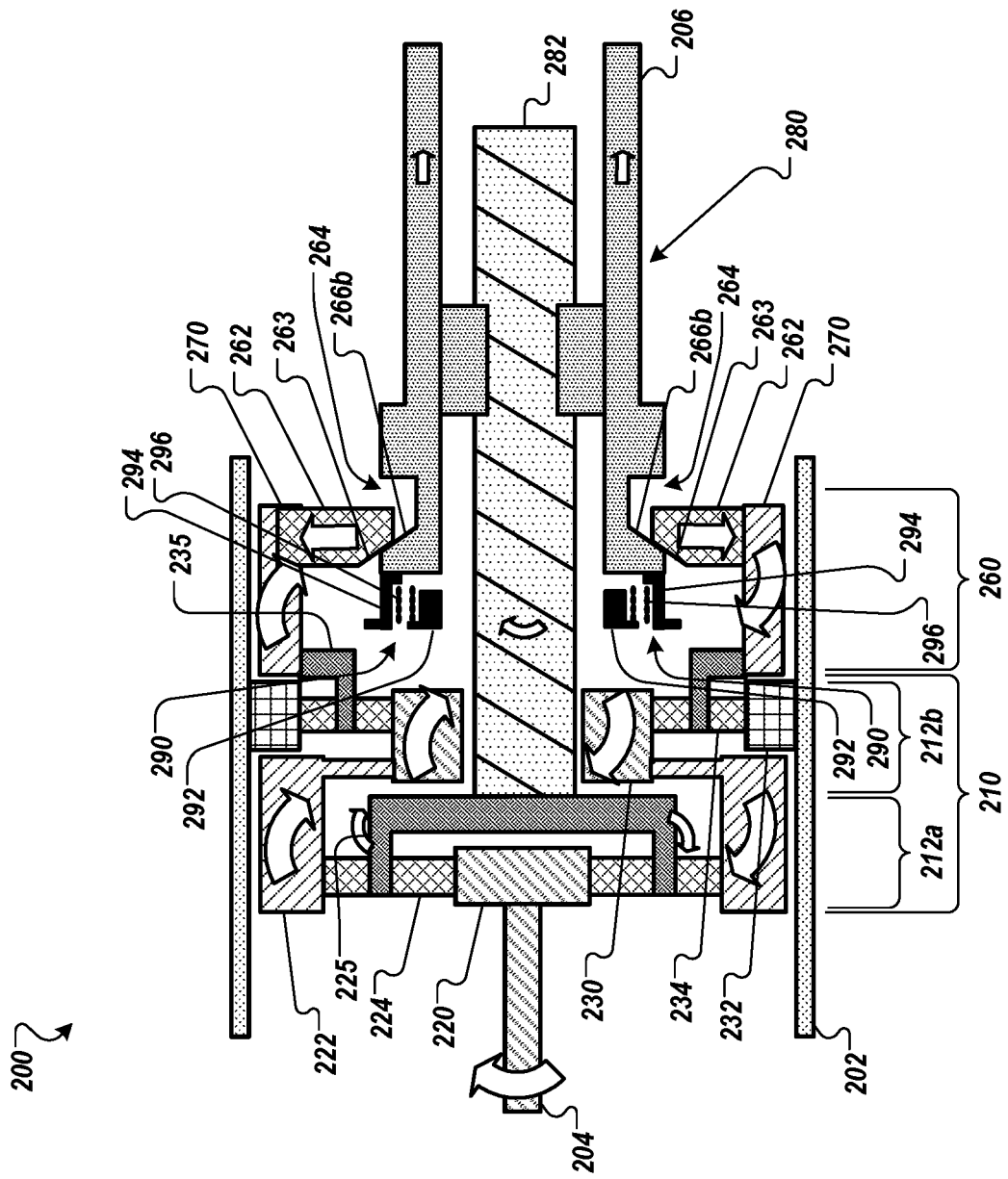
FIG. 4 shows a cross section view of the example locking rotary actuator mechanism in a partly unlocked configuration.

FIG. 4 shows a cross section view of the example locking rotary actuator mechanism 200 in a partly unlocked configuration. Once the friction between the lock keys 262 and the lock rotor 270 has been overcome, the lock rotor 270 can begin to rotate such that the lock keys 262 are permitted to move radially outward. With the lock keys 262 being able to move, the linear output assembly 206 and the rotary-to-linear motion conversion assembly 280 are also able to start moving.

With the screw lead 282 able to rotate, the planet carrier 225 and the planet gear assembly 224 are also able to start to rotate. At this stage, a relatively small portion of the torque at the sun gear assembly 220 is available for transfer through the planet gear assembly 224 and the planet carrier 225 to start initial rotation of the screw lead 282 and cause an initial extension movement of the linear output assembly 206. Movement of the linear output assembly 206 causes mechanical interference between the axial groove face 266b and the bevel 263, which urges radially outward movement of the lock keys 262.

Also visible in FIG. 4 is a lock key retainer 290 configured to be moved linearly between a first lock key retainer configuration in which radial displacement of the lock keys 262 from the unlocked position to the locked position is prevented, and a second lock key retainer configuration in which radial displacement of the lock key 262 from the unlocked position to the locked position is permitted. The lock key retainer 290 includes a stationary portion 292 that is directly or indirectly affixed to the housing 202 to remain substantially unmoved relative to movement of the linear output assembly 206. The lock key retainer 290 also includes a moveable portion 294 that is configured to move linearly relative to the stationary portion 292. The lock key retainer 290 also includes a bias member 296 (e.g., a spring) that is partly compressed between the stationary portion 292 and the moveable portion 294, to urge the moveable portion 294 into contact with the linear output assembly 206. In the illustrated example, the lock key retainer 290 is compressed and inactive, but the function of the lock key retainer 290 will be discussed further in the description of FIG. 5.

Figure 5:
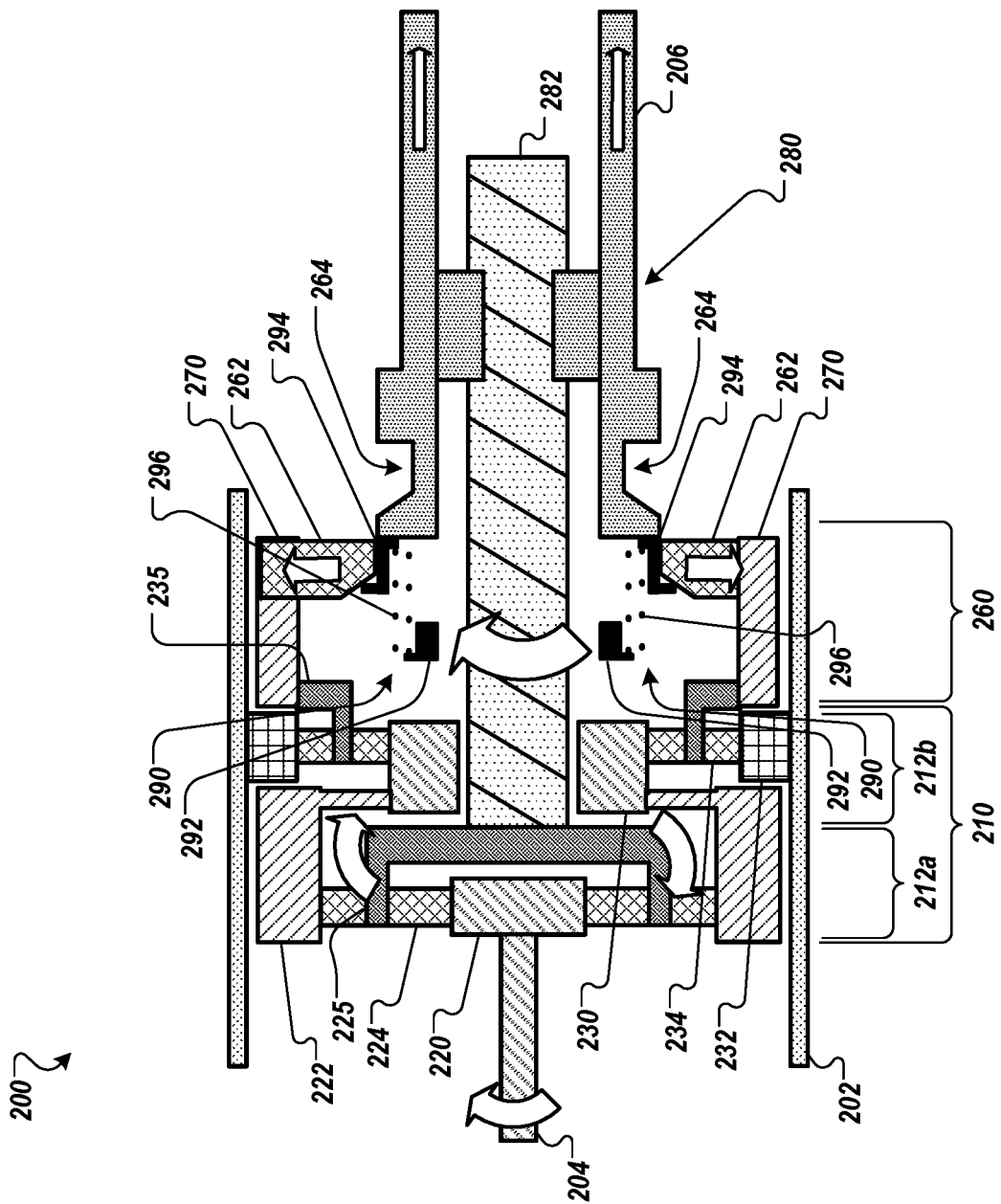
FIGS. 5 and 6 show cross section views of the example locking rotary actuator mechanism in an unlocked configuration.
Figure 6:
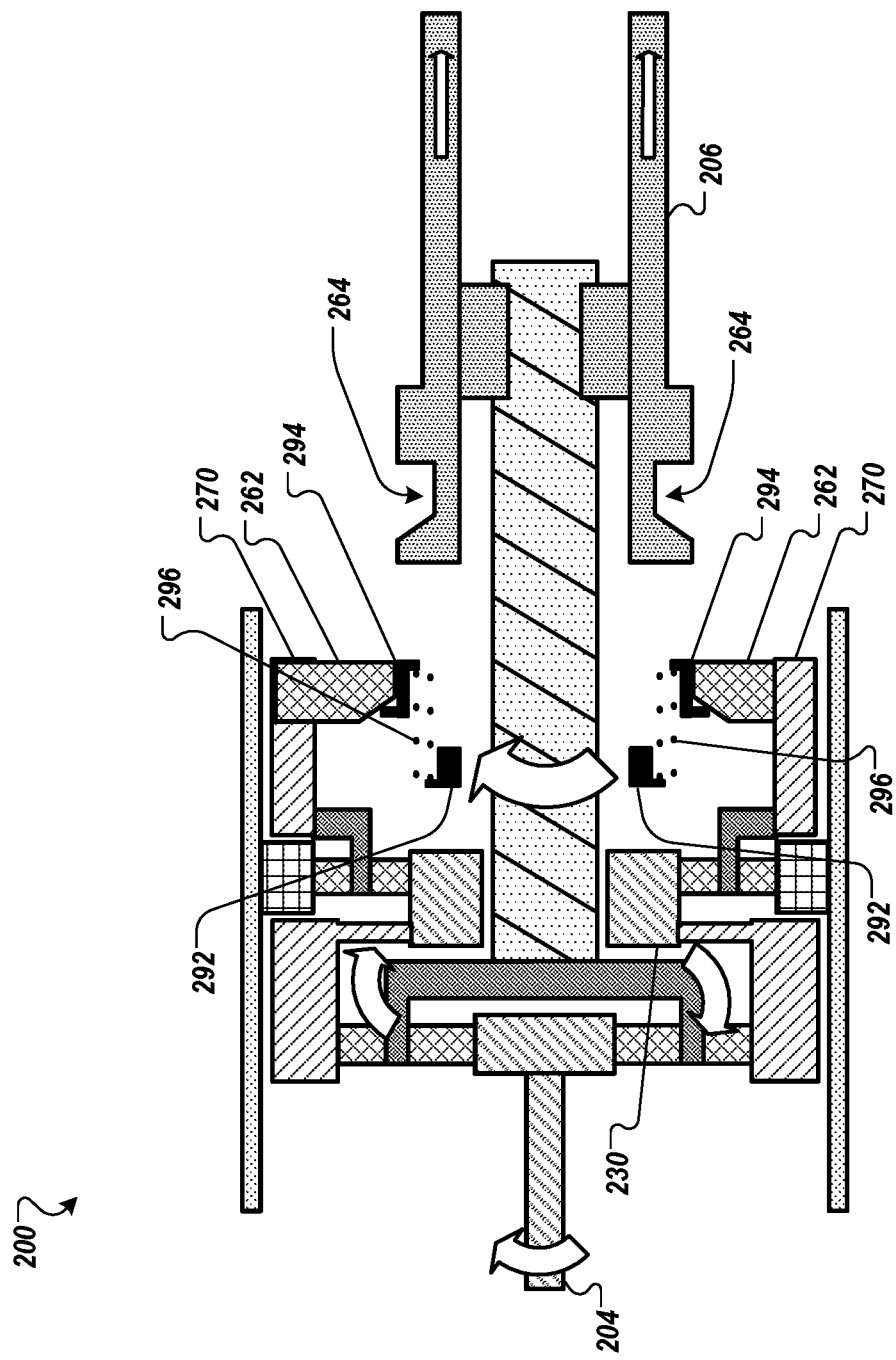

FIGS. 5 and 6 show cross section views of the example locking rotary actuator mechanism 200 in an unlocked configuration. The lock rotor 270 is configured to rotate through a limited, predetermined range of angles (e.g., about 15 degrees) between a hard stop at a position corresponding to the locked configuration (e.g., in which the lock keys 262 are able to fully escape the groove 264) and another hard stop at a position corresponding to a fully unlocked configuration (e.g., in which the lock keys 262 are prevented from escaping the groove 264). The configuration of the lock rotor 270 is discussed in more detail in the description of FIG. 11.

In FIG. 5, the lock rotor 270 is hard stopped at the position that corresponds to the unlocked configuration. The hard stop prevents further rotation of the lock rotor 270, substantially grounding the lock rotor 270 and preventing further rotation of the planet carrier 235, the planet gear assembly 234, the sun gear assembly 230, and the ring gear assembly 222. With the ring gear assembly 222 effectively grounded, substantially all of the torque provided at the rotary input shaft member 204 to be directed through the planet gear assembly 224 and the planet carrier 225 to the screw lead 282 to urge extension of the linear output assembly 206. With the lock keys 262 being fully escaped from the groove 264, the linear output assembly 206 is able to extend.

As the linear output assembly 206 extends its output position, the bias member 296 expands between the stationary portion 292 and the moveable portion 294, urging the moveable portion 294 to follow the linear output assembly 206 as it extends. The moveable portion 294 provides a radial face that substantially extends the radially outermost surface of the linear output assembly 206. As the linear output assembly 206 extends beyond the axial output position location of the lock keys 262, the moveable portion 294 moves to provide a physical barrier that keeps the lock keys 262 in the radially extended, unlocked position.

In FIG. 6, the linear output assembly 206 continues to extend while the lock keys 262 are maintained in their unlocked positions. Retraction of the linear output assembly 206 is performed by reversing the rotation of the rotary input shaft member 204, which brings the linear output assembly 206 back into contact with the moveable portion 294 to urge compression of the bias member 296 and allow the lock keys 262 to move radially out of the unlocked position toward the locked configuration within the groove 264. Once the linear output assembly 206 is fully retracted, the sun gear assembly 230 effectively becomes grounded, and torque is directed toward rotation of the lock rotor 270 toward the locked position. The lock rotor 270 is configured to urge the lock keys 262 to move radially inward into the groove 264 and prevent them from being displaced radially (e.g., due to tension on the linear output assembly 206).

Figure 7A:
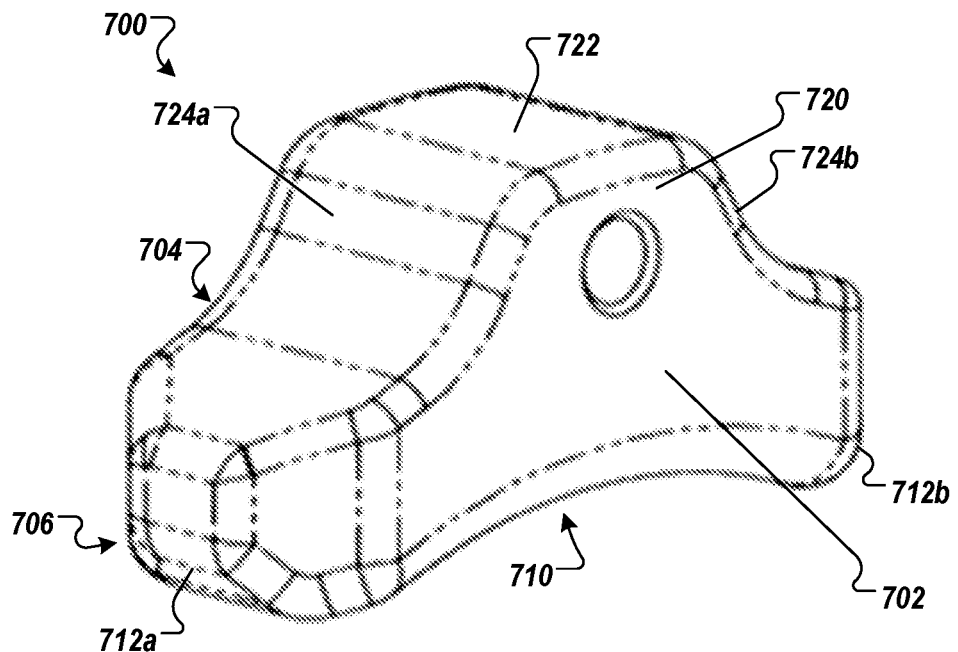
FIGS. 7A and 7B show a front perspective and a cross section view of an example lock key.
Figure 7B:
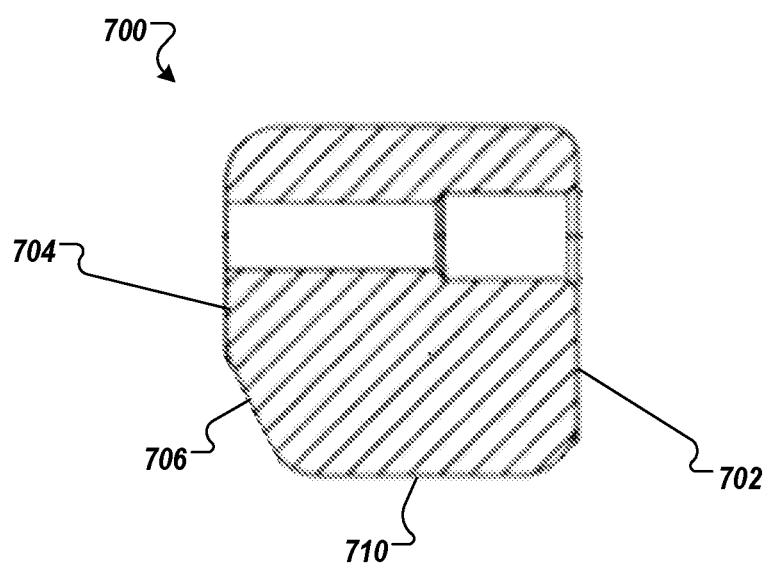

FIGS. 7A and 7B show a front perspective and a cross section view of an example lock key 700. In some embodiments, the lock key 700 can be the example lock key 262 of FIGS. 2-6. The lock key 700 has a front face 702 and a rear face 704. The rear face 704 includes a bevel 706 (e.g., angled about 25 degrees relative to the rear face). In some embodiments, the bevel 706 can be the bevel 263. In the locked configuration, the bevel 706 contacts the axial groove face 266b to prevent extension of the linear output assembly 206.

The lock key 700 has bottom surface 710 that is configured to rest against the linear output assembly 206 in the locked configuration and rest against the moveable portion 294 of the lock key retainer 290 in the unlocked configuration. The bottom surface 710 includes bevels 712a and 712b that can guide radially inward movement of the lock key 700 (e.g., moving into locking position within the groove 264).

The lock key 700 also has a crown 720 that is configured to contact the lock rotor 270. In the locked configuration, a top surface 722 of the crown contacts an inner radius of the lock rotor 270 to retain the lock key in the radially inward, locked configuration. In the unlocked configuration, the crown 720 extends into a corresponding, radially outward recess in the lock rotor that can rotate into and out of radial alignment with the crown 720.

The crown 720 includes a radiused face 724a and a radiused face 724b. During locking, the lock rotor 270 rotates relative to the lock key 700, and the radiused faces 724a-724b act as ramps against the circumferential ends of the lock rotor recesses to urge the lock key 700 to move radially inward into the locked configuration.

FIGS. 8-11 depict an exemplary embodiment of a lock assembly 800. In some embodiments, the lock assembly 800 can be the example rotary lock assembly 260 of FIGS. 2-6. The lock assembly 800 includes an epicyclic gear assembly such as the example epicyclic gear subassembly 212b.

A sun gear 840 (e.g., the example sun gear assembly 230) of the epicyclic gear arrangement may provide the mechanical drive input to the gear assembly, and a planet carrier 852 couples a screw lead (e.g., the screw lead 282) to a planet gear 844 to provide the energy to extend and retract the linear output assembly 206. An outer diameter of the ring gear 848 (annulus, shown in FIGS. 9 and 10) of the epicyclic gear arrangement may be nested in a bearing race and directly attached to a lock rotor 816 visible in FIG. 11 (e.g., the lock rotor 270) via a rotor extension 856. In operation, the ball screw serves as the driver, and the linear output member is responsive to the rotation of the ball screw to move axially.

Figure 9:
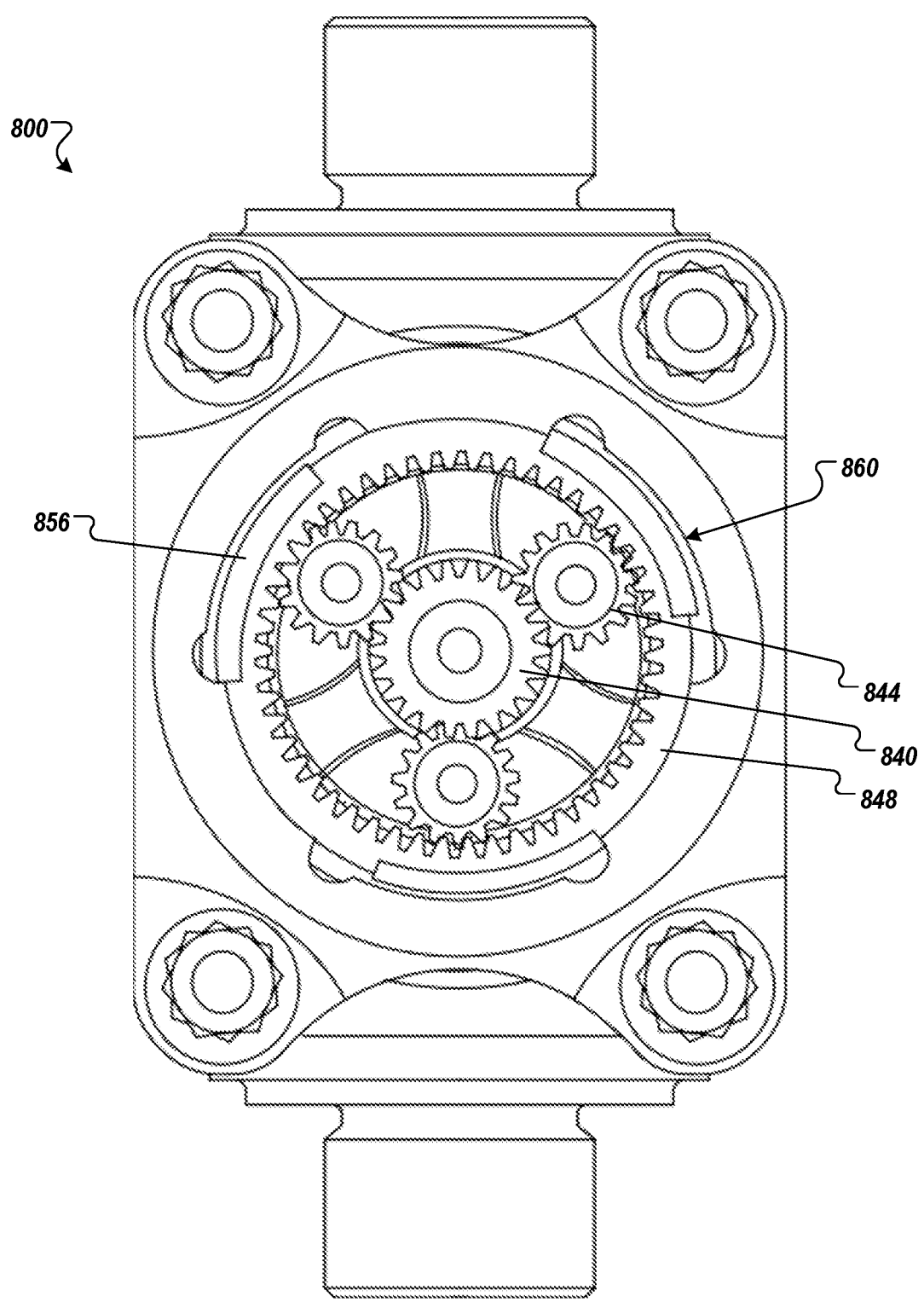
FIG. 9 shows another cross section view of the example locking rotary actuator mechanism.

In an exemplary embodiment, rotation of the lock rotor 816 to move to the unlocked position may be provided by the epicyclic gear assembly initially operating in what is known as a "star" mode, during a lost motion stroke. With reference to FIG. 9, the rotor extension 856 (which is coupled to ring gear 848) acts as a key that engages a radial slot 860 that defines the rotational end stops of the lock rotor 816 from the locked to unlocked position. In some embodiments, a torsion spring may be included that directly biases the lock rotor 816 to the locked position.

In use, to extend the linear output assembly 206, energy is input (such as via a motor, for example) to the sun gear assembly 230. Because the linear output assembly 206 is constrained from any axial motion or movement or motion by a collection of lock keys 820 (e.g., the lock keys 262), the screw lead 282 cannot turn and advance the linear output assembly 206. Therefore, the planet carrier 852 is locked until the lost motion unlocks the lock keys 820. As such, the only response to the rotation input by the sun gear 840 is to rotate the ring gear 848, which is coupled to the lock rotor 816. The unlocking of the lock keys 820 in response to rotation of the lock rotor 816 mechanically coincides with the rotor extension 856 bottoming out in the slot 860. Bottoming out of the rotor extension 856 in the slot 860, and unlocking the lock keys 820, thereby results in locking the ring gear 848 and freeing the planet carrier 852 to allow a planet gear 844 to revolve around the sun gear 840. Thus, the epicyclic gear arrangement changes from star mode (fixed planet carrier 852, free sun gear 840, and free annulus 848) to planetary mode (fixed annulus 848, free sun gear 840, and free planet carrier 852). In the planetary mode, the energy input to the sun gear 840 is used to cause the planet gear 844 to revolve around the sun gear 840, and drive the planet carrier 852, which, in turn drives the screw lead 282 and thereby, via nut 284, causes the linear output assembly 206 to move axially.

To retract the linear output assembly 206 and rotate the lock rotor 816 to the locked position, this process is reversed. The motor driving the sun gear 840 reverses direction. The ring gear 848 reverses the load direction and attempts to rotate the lock rotor 816 from the unlocked position to the locked position. However, the lock keys 820 are constrained in the withdrawn position within the grooves 838 of the lock rotor 816 by the lock key retainer 290, and thereby prevent any rotation of the lock rotor 816. This effectively locks the ring gear 848 (e.g., via rotor extensions 856), and defines the epicyclic mode. Therefore, the input rotation of the sun gear 840 is transferred to the planet carrier 852, which causes the screw lead 282 to rotate, and retract the linear output assembly 206.

In response to the linear output assembly 206 coming to the fully retracted position, the lock key retainer 290 is pushed out of the way (axially) by the linear output assembly 206 and the lock keys 820 are aligned with the groove 264 in the linear output assembly 206. In response to the linear output assembly 206 being fully retracted, and thus no longer capable of any further axial motion, the screw lead 282 (and thus planet carrier 852) is locked, and the epicyclic gear arrangement transitions from planetary mode to star mode. This now allows the lock rotor 816 to rotate from the unlocked to the locked position, pushing the lock keys 820 radially inward into the groove 264, thus re-locking the linear output assembly 206.

It will be appreciated that the output rotation direction of the ring gear 848 and lock rotor 816 during the lost motion stroke (e.g., star mode) is opposite of that of the planet carrier 852 and the screw lead 282 during extension of the linear output assembly 206 (e.g., planetary mode). This is a fundamental characteristic of epicyclic gears operated in both star and planetary modes. This lost motion feature results in a design that is self-locking and self-unlocking without any additional commands or signals required in addition to the drive torque.

Figure 8:
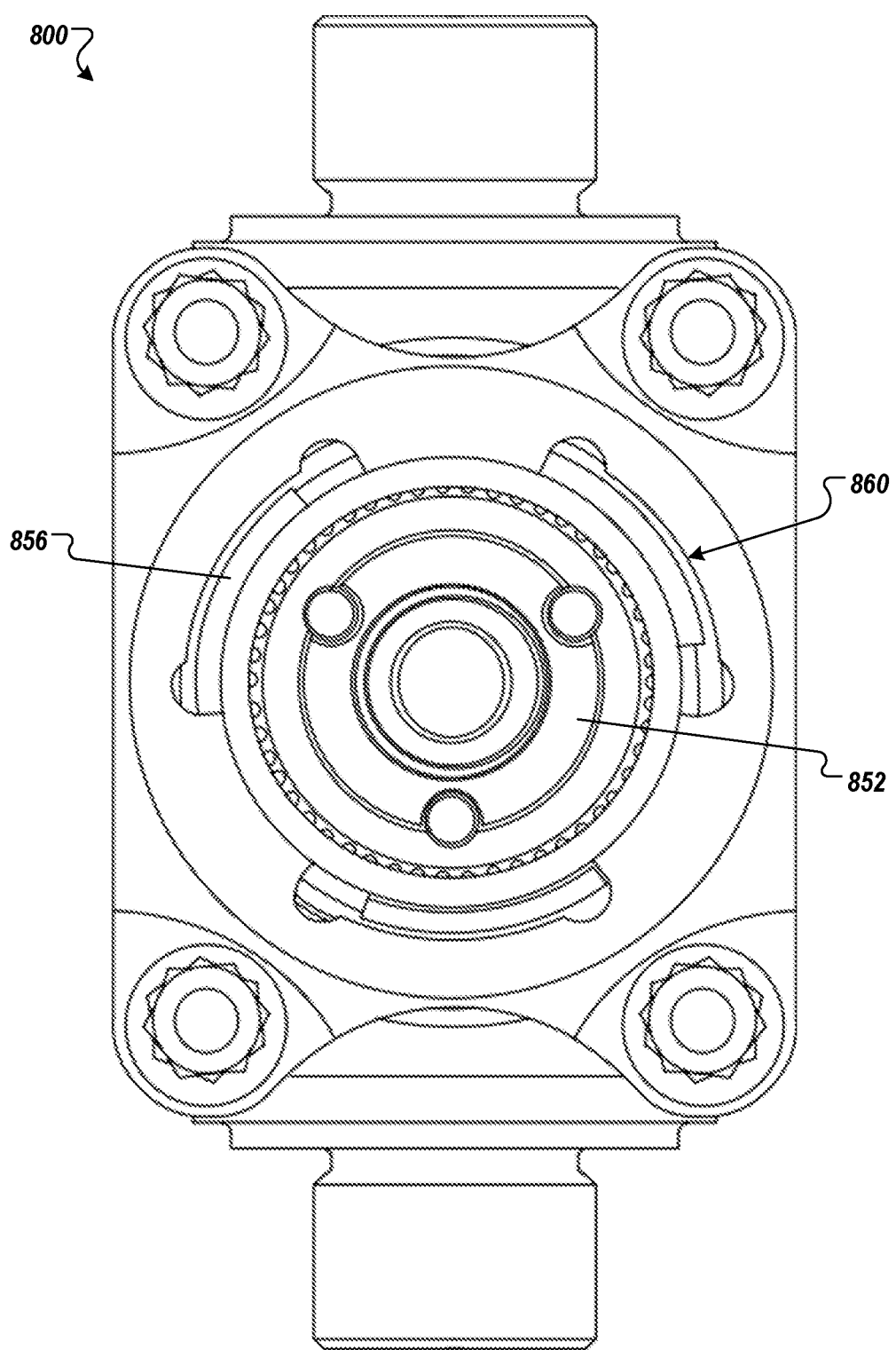
FIG. 8 shows a cross section view of the example locking rotary actuator mechanism.
Figure 10:
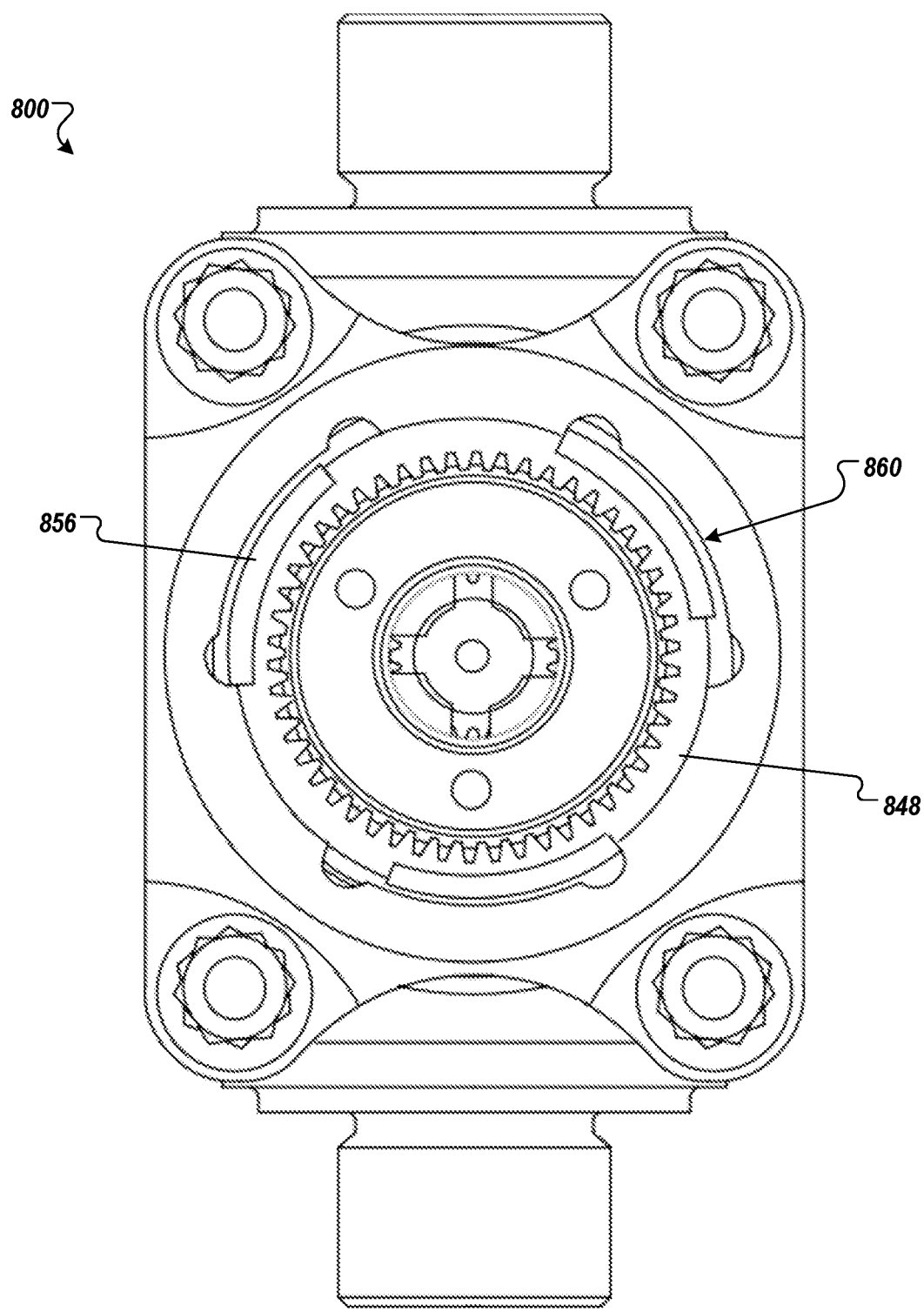
FIG. 10 shows another cross section view of the example locking rotary actuator mechanism.
Figure 11:
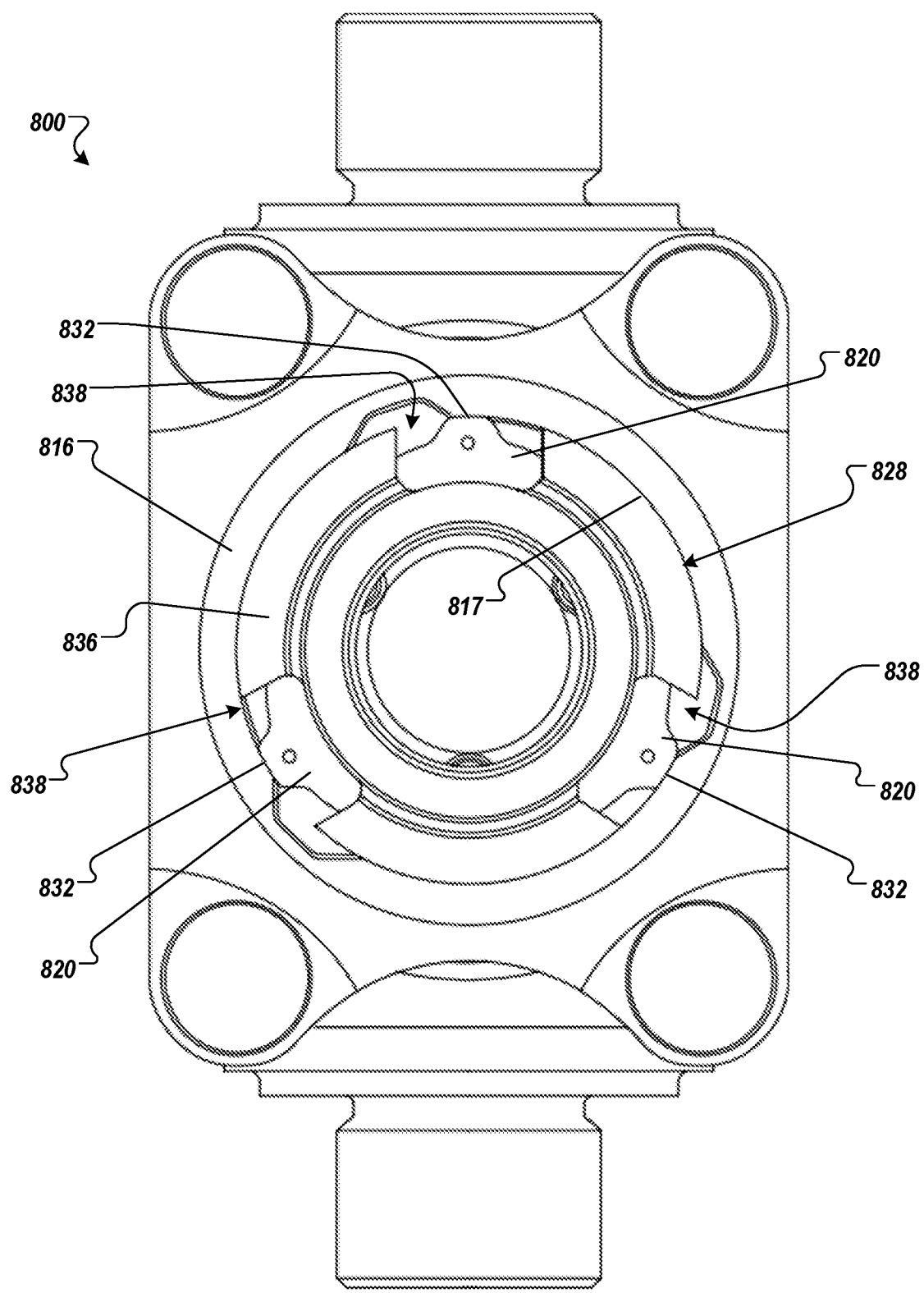
FIG. 11 shows another cross section view of the example linear actuator of FIG. 1.

To increase clarity, additional cross sectional figures of the lock assembly 800 as described herein and shown in FIG. 8 are provided. FIG. 9 depicts a cross section view of the epicyclic arrangement shown in FIG. 8 including the sun gear 840, planet gear 844, ring gear 848, and planet carrier 852. FIG. 10 depicts a cross section view of the epicyclic arrangement shown in FIG. 8 including the ring gear 848, planet carrier 852, and rotor extension 856. FIG. 11 depicts a cross section view of the lock rotor 816 with lock keys 820 in the locked position.

As shown in FIG. 11, the lock rotor 816 is disposed coaxially with the linear output assembly 206, and includes a bore 828 having an inner surface 817 that interfaces with a crown 832 of the lock key 820. A lock ring 836 is grounded (e.g., fixed relative to the housing) and includes grooves 838 that guide the lock keys 820 and restrict their displacement to radial motion. In an exemplary embodiment, an inside radius of the bore 828 will be approximately equal to an outside radius of the crown 832 when the lock key 820 is engaged with the radial groove 824. In use, in response to the lock rotor 816 being disposed in the locked position of FIGS. 2 and 3, the bore 828 interfaces with the crown 832 of the lock key 820 and the lock key 820 is restrained from any outward radial motion (such as the lock key motion illustrated in FIG. 4, for example). Therefore, the lock key 820 engages and is retained or held within, the groove 824 of the linear output assembly 206 by the rotation of the rotary input shaft member 204.

Figure 12:
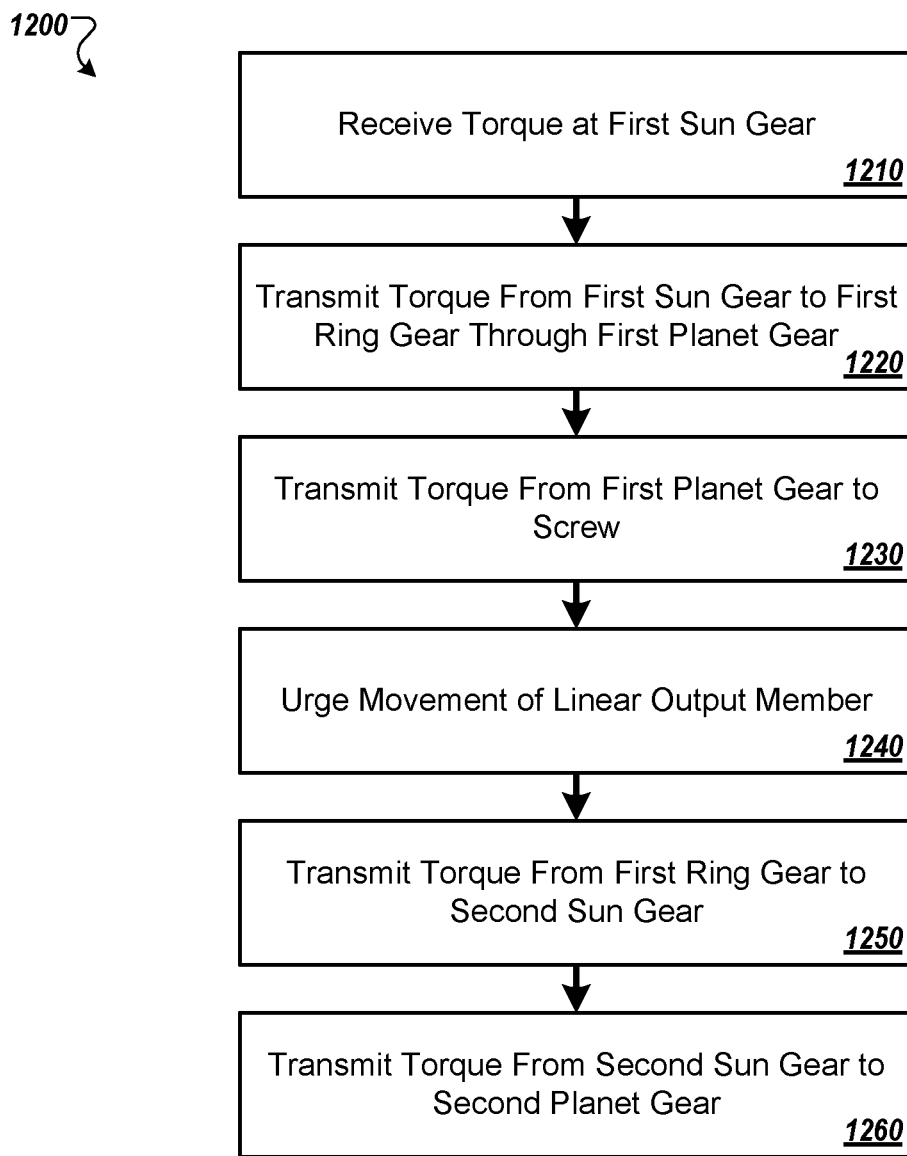
FIG. 12 shows a flow diagram of an example process for operating a linear actuator.

FIG. 12 shows a flow diagram of an example process 1200 for operating a linear actuator. In some implementations, the process 1200 can be performed by all or part of the example linear actuator 100 of FIG. 1 and/or the example locking rotary actuator mechanism 200 of FIGS. 2-6.

At 1210, torque is received at a first sun gear of a first epicyclic gear assembly. For example torque from the rotary input shaft member 204 can be received at the sun gear assembly 220.

At 1220, torque is transmitted from the first sun gear to a first ring gear of the first epicyclic gear assembly through a first planet gear assembly of the first epicyclic gear assembly. For example, torque can be transmitted from the sun gear assembly 220 to the ring gear assembly 222 through the planet gear assembly 224.

At 1230, torque is transmitted from the first planet gear assembly to a screw. For example, rotation of the planet gear assembly 224 can urge rotation of the screw lead 282 through the planet carrier 225.

At 1240, movement of a linear output member is urged through a nut configured for linear motion based on rotation of the screw. For example, rotation of the screw lead 282 relative to the nut 284 can urge linear movement of the linear output assembly 206.

1250, torque is transmitted from the first ring gear to a second sun gear of a second epicyclic gear assembly. For example, rotation of the ring gear assembly 222 can urge rotation of the sun gear assembly 230.

At 1260, torque is transmitted from the second sun gear to a second planet gear engaged between the second sun gear and a second ring gear. For example, torque applied to the sun gear assembly 230 can be transmitted to the planet gear assembly 234, which is engaged between the sun gear assembly 230 and the ring gear assembly 232.

In some implementations, the process 1200 can also include urging radial displacement of a lock key from a first lock key configuration to a second lock key configuration based on linear movement of the linear output member. For example, the lock rotor 270 can be moved from a locked rotational position to an unlocked rotational position, which can allow the lock keys 262 to move radially outward from a locked configuration to an unlocked configuration.

In some implementations, the process 1200 can also include contacting, based on movement of the linear actuator, the lock key with an axial groove face of a groove defined in the linear output member and configured to receive the lock key in the first lock key configuration. In the first configuration, the lock key can prevent linear movement of the linear output member based on mechanical interference between the lock key and the axial groove face, and can prevent rotation the screw based on the prevented linear movement of the linear output member. With rotation of the screw prevented, rotation of the first planet gear assembly is also prevented based on the prevented rotation of the screw, which can cause substantially all torque received at the first sun gear to be transmitted to the first ring gear. For example, the linear output assembly 206 can contact the lock keys 262 in the groove 264 to prevent further axial movement of the linear output assembly 206. With movement of the linear output assembly 206 stopped, rotation of the screw lead 282, the sun gear assembly 230, and the planet carrier 225 is stopped. With the planet carrier 225 prevented from moving, substantially all torque from the sun gear assembly 220 is transmitted to the ring gear assembly 222.

In some implementations, the process 1200 can also include transmitting torque from the second planet gear to a lock rotor, and rotating the lock rotor from a first lock rotor configuration to a second lock rotor configuration. For example, movement of the planet gear assembly 234 can be transmitted to the lock rotor 270 through the planet carrier 235.

In some implementations, the first lock rotor configuration can be a first rotational position defined by a first lock rotor end stop configured to mechanically interfere with rotation of the lock rotor in a first direction, and the second lock rotor configuration is a second rotational position defined by a second lock rotor end stop configured to mechanically interfere with rotation of the lock rotor in a second direction opposite the first direction. For example, the example radial slot 860 can defines the rotational end stops of the lock rotor 816 from the locked to unlocked position.

In some implementations, the lock rotor can be configured to prevent radial displacement of a lock key from a first key configuration to a second key configuration in the first lock rotor configuration, and is configured to permit radial displacement of the lock key from the first key configuration to the second key configuration in the second lock rotor configuration. For example, FIG. 11 shows that the lock rotor 816 includes grooves 838 that guide the lock keys 820 and restrict their displacement to radial motion. In response to the lock rotor 816 being disposed in the locked position of FIGS. 2 and 3, the bore 828 can interface with the crown 832 of the lock key 820 and the lock key 820 can be restrained from any outward radial motion (such as the lock key motion illustrated in FIG. 4, for example). Therefore, the lock key 820 engages and is retained or held within, the groove 824 of the linear output assembly 206 by the rotation of the rotary input shaft member 204. When the lock rotor 816 is rotated to bring the grooves 838 into radial alignment with the crowns 832, the lock keys 820 have sufficient space to move radially outward, out of contact with (and thus unlocking) the linear output assembly 206.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of locking a linear actuator, the method comprising:
   receiving torque at a first sun gear of a first epicyclic gear assembly;
   transmitting torque from the first sun gear to a first ring gear of the first epicyclic gear assembly through a first planet gear assembly of the first epicyclic gear assembly;
   transmitting torque from the first planet gear assembly to a screw;
   urging movement of a linear output member through a nut configured for linear motion based on rotation of the screw;
   transmitting torque from the first ring gear to a second sun gear of a second epicyclic gear assembly; and
   transmitting torque from the second sun gear to a second planet gear engaged between the second sun gear and a second ring gear.

2. The method of claim 1, further comprising urging radial displacement of a lock key from a first lock key configuration to a second lock key configuration based on linear movement of the linear output member.

3. The method of claim 2, further comprising:
- contacting, based on movement of the linear actuator, the lock key with an axial groove face of a groove defined in the linear output member and configured to receive the lock key in the first lock key configuration;
- preventing linear movement of the linear output member based on interference between the lock key and the axial groove face;
- preventing rotation of the screw based on the prevented linear movement of the linear output member;
- preventing rotation of the first planet gear assembly based on the prevented rotation of the screw; and
- transmitting substantially all torque received at the first sun gear to the first ring gear.

4. The method of claim 1, further comprising:
- transmitting torque from the second planet gear to a lock rotor; and
- rotating the lock rotor from a first lock rotor configuration to a second lock rotor configuration.

5. The method of claim 4, wherein the first lock rotor configuration is a first rotational position defined by a first lock rotor end stop configured to interfere with rotation of the lock rotor in a first direction, and the second lock rotor configuration is a second rotational position defined by a second lock rotor end stop configured to interfere with rotation of the lock rotor in a second direction opposite the first direction.

6. The method of claim 4, wherein the lock rotor is configured to prevent radial displacement of a lock key from a first key configuration to a second key configuration in the first lock rotor configuration, and is configured to permit radial displacement of the lock key from the first key configuration to the second key configuration in the second lock rotor configuration.

* * * * *